United States Patent [19]

Randar et al.

[11] Patent Number: 4,561,155

[45] Date of Patent: Dec. 31, 1985

[54] CORD MANUFACTURING APPARATUS AND CONNECTOR ATTACHMENT MACHINE THEREFOR

[75] Inventors: Magnus Randar, Menomonee Falls, Wis.; David G. Moore, Ecanaba, Mich.

[73] Assignee: Artos Engineering Company, New Berlin, Wis.

[21] Appl. No.: 507,233

[22] Filed: Jun. 22, 1983

[51] Int. Cl.[4] ........................ H01R 43/00; B23P 23/00

[52] U.S. Cl. .................................. 29/33 M; 29/564.4; 29/705; 29/710; 29/749

[58] Field of Search ................ 29/33 M, 564.1, 564.6, 29/749, 876, 705, 707, 710, 715, 716, 564.2, 564.4, 564.7, 564.8, 566, 566.3, 753

[56] References Cited

U.S. PATENT DOCUMENTS

| | | | |
|---|---|---|---|
| 3,930,307 | 1/1976 | Scholthoefer et al. | 29/707 |
| 4,055,889 | 11/1977 | Fusco et al. | 29/710 |
| 4,110,880 | 9/1978 | Peppler et al. | 29/564.6 X |
| 4,211,462 | 7/1980 | Wolfthal | 339/103 M |
| 4,258,469 | 3/1981 | Salvegen | 29/749 X |
| 4,281,442 | 8/1981 | Senior et al. | 29/749 X |

*Primary Examiner*—Gil Weidenfeld
*Assistant Examiner*—Glenn L. Webb
*Attorney, Agent, or Firm*—James E. Nilles; Thomas F. Kirby

[57] ABSTRACT

Apparatus is provided for manufacturing electrical cords comprising modular multi-contact connectors attached to opposite ends of a segment of a multi-conductor sheathed cable. Each connector comprises a plastic housing having a cavity for receiving an end of the cable segment, displaceable anchors for mechanically engaging the cable sheath and the insulation on the conductors, and flat contacts displaceable for piercing the insulation on the conductors and making electrical contact with the wires therewithin. The apparatus includes: machinery for cutting segments from a strand of cable and for conveying them along a path; strippers along the path for removing small portions of the sheath from the ends of the segments to expose the ends of the insulated conductors therewithin; trimmers along the path for trimming the exposed ends of the insulated conductors; and connector attachment machines along the path. Each connector attachment machine comprises: a magazine and a feed mechanism which places a connector on an end of a cable segment; a first press operable to displace the anchors and mechanically anchor the housing to the cable sheath and to the insulated conductors; second and third presses operable in succession to force the contacts through the insulation and into electrical contact with the wires therein; and a fourth press which operates to perform a continuity test on a finished cord and disposes of any defective cord either by sorting it out for further rework or by destroying it by severance. Each press comprises a movable drive component and these components are driven in synchronism with each other by a motor-driven rack and pinion mechanism.

4 Claims, 18 Drawing Figures

CORD MANUFACTURING APPARATUS AND CONNECTOR ATTACHMENT MACHINE THEREFOR

BACKGROUND OF THE INVENTION

1. Field of Use

This invention relates generally to apparatus for manufacturing electrical cords which comprise modular connectors connected to opposite ends of cable segments.

In particular, it relates to such apparatus which includes means for cutting cable segments of desired length from a strand of cable, a conveyor for moving the cable segments along a path, means to strip and trim insulation from the ends of the segments, and an improved connector attachment machine which mechanically and electrically connects a multi-contact modular connector to an end of a multi-conductor sheathed cable segment, which performs an electrical continuity test on the finished cords, and which destroys or sorts out a defective cord.

2. Description of the Prior Art

Electric cords which comprise multi-conductor cable segments having multi-contact modular connectors at both ends of the segments are used in the telecommunication, electronic and automotive fields to facilitate interconnection and disconnection of various system components or to facilitate replacement or substitution of cords of various types, lengths or colors. One type of cord, such as a telephone cord used to connect the hand-held microphone/receiver unit of a telephone to the base unit of the telephone, employs a multi-contact connector at each end of the multi-conductor cable segment and each connector is releasably insertable in a mating receptacle in the associated phone unit.

U.S. Pat. No. 4,211,462 discloses such a commercially available modular connector and associated cable segment therefor. Specifically, that patent discloses a unipartite housing for a modular connector for terminating flat cords or cable segments having a plurality of conductors enclosed within a jacket. The housing has a cord receiving cavity formed therein defining a forward conductor receiving portion and a rearward jacket receiving portion, the conductor receiving portion having a plurality of parallel conductor receiving troughs provided therein. A corresponding plurality of slots are provided in aligned relationship with the troughs which receive flat contact terminals which electrically couple with respective conductors. Jacket and conductor anchoring members are provided in respective openings which communicate with the cord receiving cavity adapted to be pivotally moved into engaging relationship with the jacket and conductors respectively.

The connector shown in U.S. Pat. No. 4,211,462 is available with the flat contacts already mounted in slots formed in the connector housing but further displaceable to make electrical contact with respective conductors in the cable segment inserted in the housing.

U.S. Pat. No. 4,258,469 shows a connector similar to that of Pat. No. 4,211,462 but wherein the contacts are inserted into the housing during the process of attaching the connector to the end of a cable segment.

Heretofore, cords comprising multi-conductor cable segments having multi-contact modular contacts at opposite ends were manufactured in a variety of ways using various types of apparatus. For example, in Pat. No. 4,258,469 a human operator inserts the terminus of a previously cut and stripped cable segment into the body or housing of the connector and then actuates a machine (as by a pedal-operated or manually operated switch) which then mechanically and electrically attaches the contactor to the end of the segment, such machine supplying contacts to the housing as needed, whereupon the cable segment with connectors attached to one end is expelled from the machine for further finishing and testing. In some prior art installations, continuity of a finished cord is automatically tested but the result is merely displayed to a human operator who then manually removes and disposes of any defective cord.

The following U.S. patents show other prior art apparatus, machines and methods for fabricating electrical cords or similar components:

| | | |
|---|---|---|
| 4,253,222 | 4,219,913 | 3,848,316 |
| 3,777,349 | 3,114,828 | 4,173,824 |

Needless to say, techniques and apparatus requiring participation of a human operator during one or more stages of manufacture are relatively slow and costly, as compared to those which are highly automated.

SUMMARY OF THE PRESENT INVENTION

In accordance with the present invention there is provided improved, fully automated, high speed, highly accurate apparatus for manufacturing electrical cords, each cord comprising a modular multi-contact connector mechanically and electrically attached to each end of a multi-conductor sheathed cable segment. Each connector comprises a plastic housing having a cavity therein for receiving the end of a cable segment therein, displaceable anchor means for mechanically engaging the cable sheath and conductor insulation to provide strain relief, and a plurality of displaceable flat electrical contacts (one for each conductor wire) for piercing the insulation thereof and making electrical contact with the conductor therewithin. Each cable segment comprises a plurality of insulated electrical conductors having an insulating sheath therearound.

The apparatus comprises: a machine for cutting cable segments of desired length from a continuous strand of cable; a pair of spaced apart parallel conveyor units for moving the cable segments in incremental steps along a path with the axis of each segment disposed transverse to said path and with an end of a segment projecting outward from a conveyor unit; stripping means adjacent the outboard side of each conveyor unit for removing a portion of the sheath from an end of a segment to expose the insulated conductors therewithin; trimming means adjacent the outboard side of each conveyor unit for trimming the exposed ends of the insulated conductors to ensure that each electrical conductor extends substantially to the end of the insulation therearound; and connector attachment means adjacent the outboard side of each conveyor unit. Each connector attachment means receives the stripped and trimmed end of a cable segment, disposes a connector thereon, mechanically and electrically connects the connector thereto to provide a finished cord, performs a continuity test on the finished cord, and destroys or sorts out a finished cord if defective.

More specifically, the connector attachment means comprises connector magazine and feed means and four presses. The first press receives the end of a cable segment which is moved thereinto by the conveyor units. The connector magazine and feed means supply a connector to the first press and associate the connector and a segment so that said end of the segment extends into the cavity in the connector housing. The first press then operates to displace the anchor means so that the connector housing mechanically engages the sheath and the insulation on the electrical conductors. The second press receives the end of the cable segment with the connector mechanically attached thereto and operates to displace some (two) of the electrical contacts so that each displaced contact pierces the insulation on an associated conductor and electrically engages the electrical conductor therewithin. The third press receives the end of the cable segment with the connector mechanically attached thereto and with some (two) of the contacts electrically engaged and operates to displace the remainder (two) of the electrical contacts so that each displaced contact pierces the insulation on an associated conductor and electrically engages the electrical conductor therewithin to provide a finished cord. The fourth press receives the end of the finished cord and operates to perform an electrical continuity test on the finished cord. The fourth press is further operable to sever or sort out the cable segment of the finished cord if the latter is defective.

Each of the four presses comprises a movable member which carries one or more tools for operating on a connector therein. Means are provided to effect synchronized movement of the movable members and include a pinion gear connected to each movable member and a reciprocably movable toothed rack engaged with the several pinion gears. Each press comprises holding means to temporarily hold the end of a wire segment and associated connector inserted therein in fixed position and each press comprises a motor to effect operation of said holding means. The fourth press comprises a first cable severing blade movable by the movable member in the press, a second cable severing blade, and a motor responsive to a test fault to move the second blade and sever the cable segment.

The connector attachment means includes a rigid supporting frame on which each press is mounted. Each pinion gear is rotatably mounted on the frame and is connected to rotate an arm which is connected to reciprocably move a link which is connected to drive the movable member for a respective press. Each arm and its associated link form a straight line when rotation of the associated pinion gear effects downward (operative) movement of said movable member to its extreme operating position to thereby ensure accurate positioning of the movable member and the tools thereon during operation.

It is to be understood that the anchor means grip both the cable sheath and the insulation on each of the several conductors therewithin. This provides very secure strain relief which prevents direct pull on the electrical conductor connections when the connector is unplugged from a receptacle.

It is also to be understood that two separate presses are employed to effect displacement first of one set of contacts and then subsequent displacement of the remaining contacts. This is done to prevent possible cracking or other damage to the plastic connector housing which sometimes results from simultaneous downward displacement of all contacts with undue strain and compression forces being applied to the housing. It is convenient and preferable in the case of a connector having a plurality of contacts to displace every other contact in one press and the remainder in the next press. For example, in a four-contact connector contacts 1 and 3 are depressed in press one and contacts 2 and 4 are subsequently depressed in the next press.

It is also to be understood that each finished and tested cord, if perfect, is moved by the conveyor to a suitable collection station, whereas a defective cord is severed in the continuity testing press and the severed pieces are disposed of elsewhere. If preferred, instead of destroying a defective cord, it may merely be sorted out for later rework. The continuity test is carried out on a cord having connectors at both ends.

The apparatus and connector attachment machine in accordance with the invention offer several advantages over the prior art. For example, all operations from the initial severance of a cable segment to the final disposition of the finished cord are carried out on automated synchronized machines and the need for a human operator at one or more stages is eliminated, thereby enabling increased speed of manufacture, more reliable manufacture, and lower cost of manufacture. The improved connector attachment machines, each of which embodies a connector and connector feed mechanism magazine, are fed with cable segments by conveyors which operate in synchronism therewith, instead of by a human operator. Furthermore, each connector attachment machine employs two separate presses for electrically connecting the connector contacts to the ends of the insulated conductors, thereby substantially eliminating the risk of flexing the plastic housing and loosen prior connections or crimps as sometimes occurs in prior art systems wherein a single press is employed to simultaneously connect all the connector contacts to their respective conductors. The connector attachment machines not only perform an electrical continuity test on each finished cord but also destroy or sort out and dispose of those found to be defective, thereby eliminating the need for a human operator to take note of and manually dispose of defective cords, as in some prior art machines. The means employed in the connector attachment machine to drive the several presses and testing device in synchronism are straightforward and relatively simple in construction and very reliable in use. Other objects and advantages of the invention will hereinafter appear.

DRAWINGS

DESCRIPTION OF A PREFERRED EMBODIMENT

Figure 1:
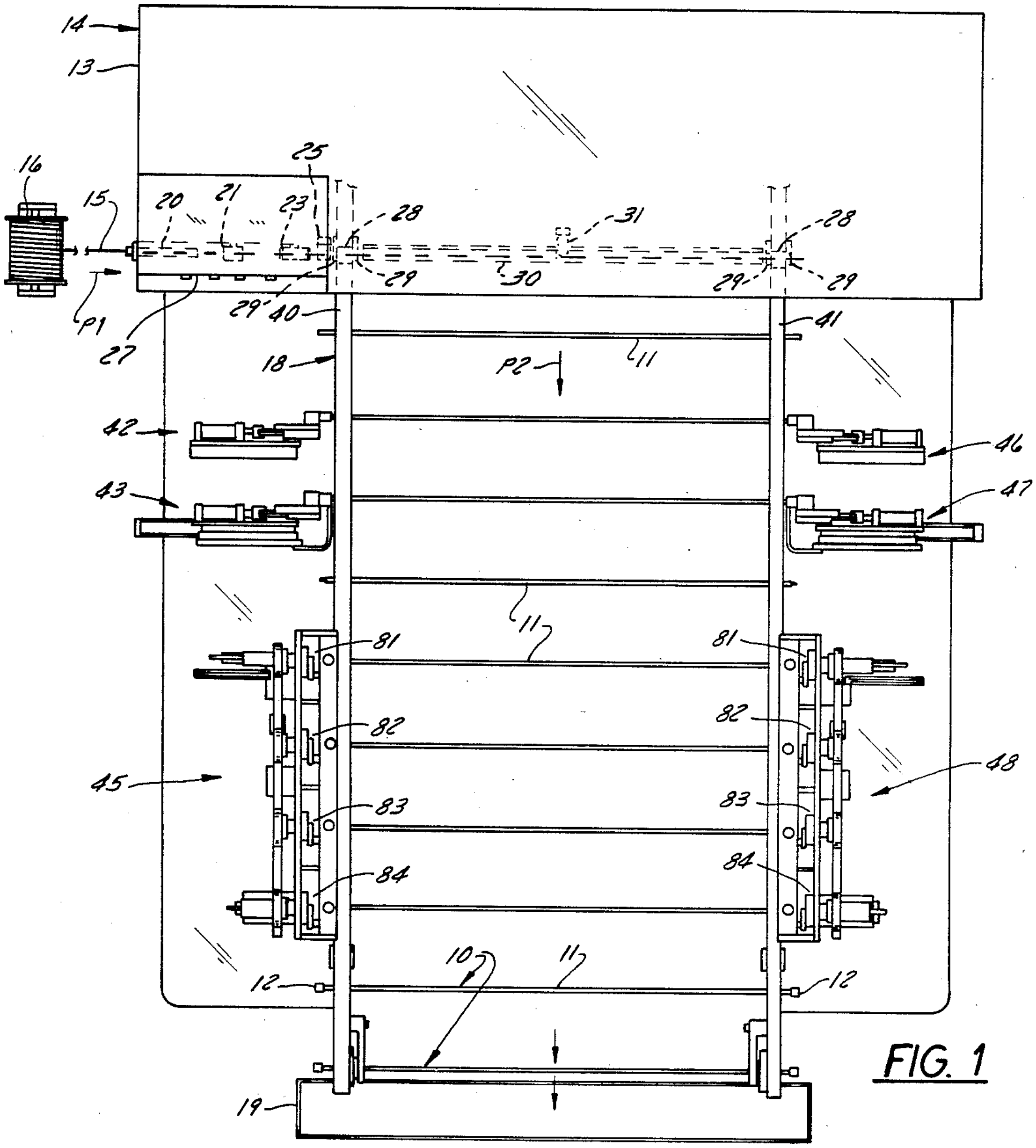
FIG. 1 is a top plan view of cord manufacturing apparatus including a cable cutter and conveyor and connector attachment machines in accordance with the invention.
Figure 2:
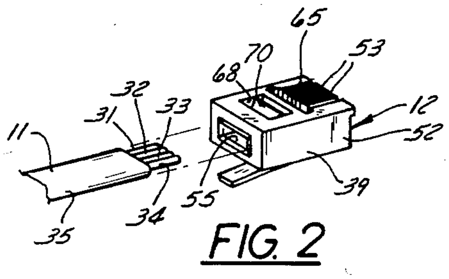
FIG. 2 is an enlarged perspective view of one end of a cable segment and a connector therefor shown prior to attachment to each other.
Figure 3:
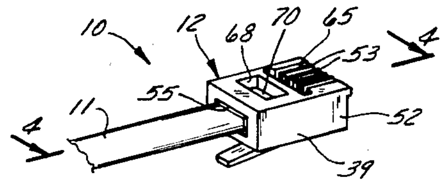
FIG. 3 is a view similar to FIG. 2 but showing the connector attached to the end of the cable segment.
Figure 4:
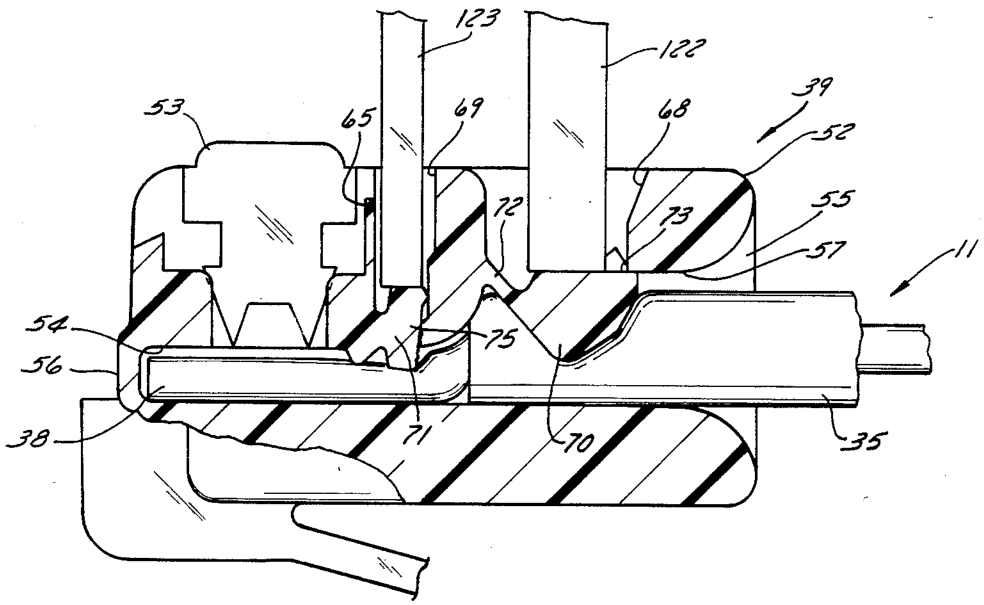
FIG. 4 is a greatly enlarged cross-section view of the connector taken on line 4—4 of FIG. 3 and showing a connector contact prior to displacement.

FIG. 1 is a top plan view of apparatus in accordance with the invention for manufacturing cords, each cord 10 comprising a cable segment 11 which has connectors 39 at opposite ends.

As FIGS. 2, 4, 14, 15 and 16 show, cable segment 11 comprises a plurality of (four) insulated conductor wires designated 31, 32, 33 and 34 which are encased in a common insulating sheath 35. Each conductor wire comprises a flexible electrical conductor 37, preferably stranded copper wire, having a layer of insulation 38 therearound.

Figure 5:
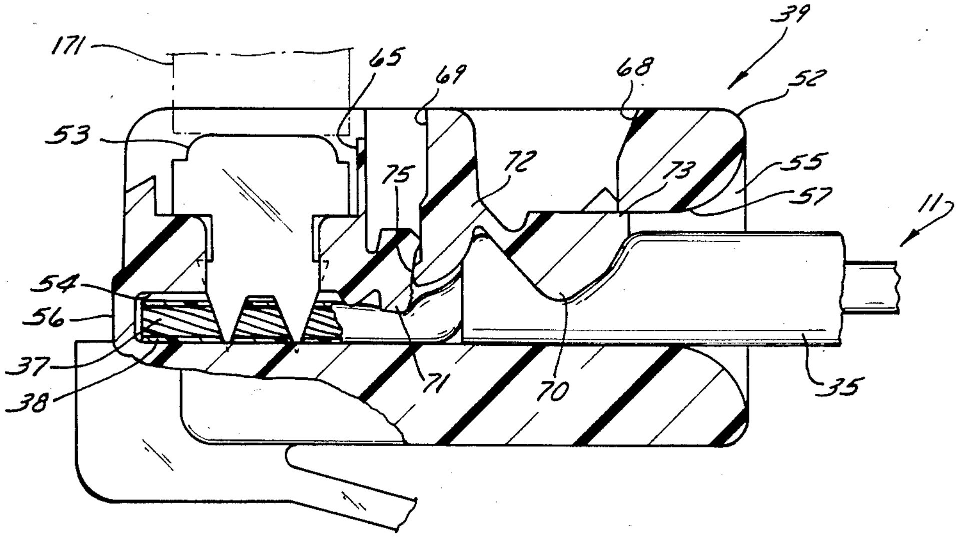
FIG. 5 is a view similar to FIG. 4 of a portion of the connector and showing the connector contact displaced and in electrical contact with a conductor wire in the connector.
Figure 11:
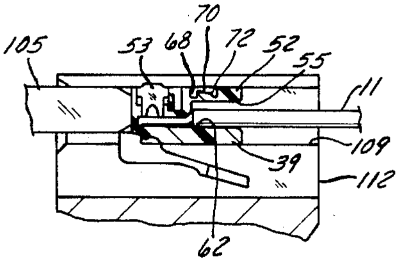
FIG. 11 is an enlarged cross-section view of the connector of FIG. 10.
Figure 12:
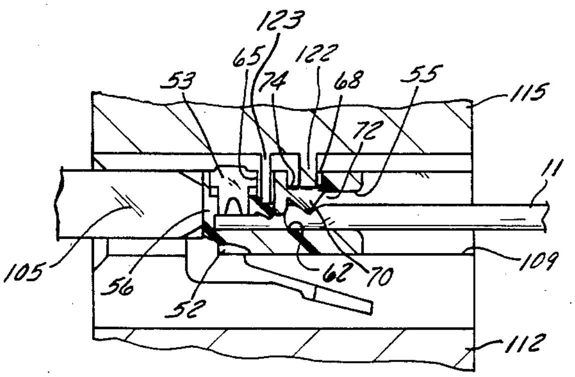
FIG. 12 is an enlarged view similar to FIG. 11 but showing the connector being acted upon by the first press of FIG. 10 which is shown in still another operating position.
Figure 13:
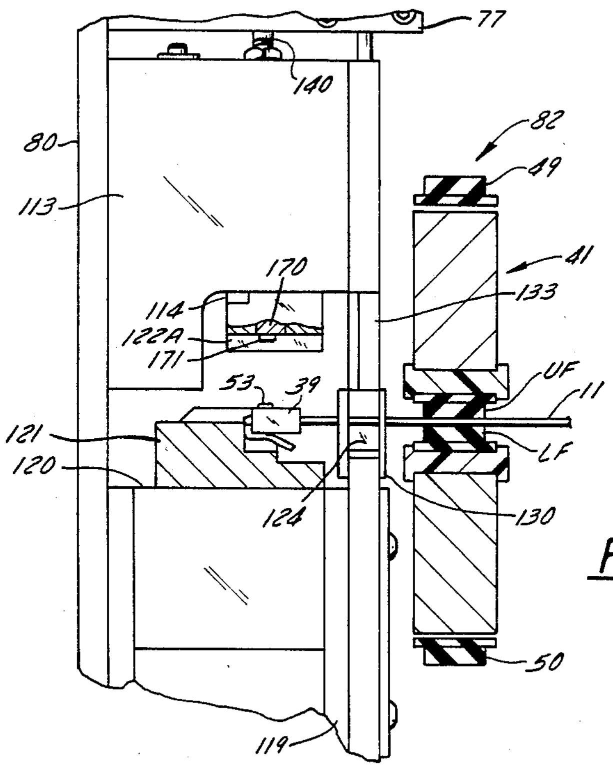
FIG. 13 is an enlarged cross-section view taken on line 13—13 of FIG. 6 and showing details of the second press in one operating position.
Figure 14:
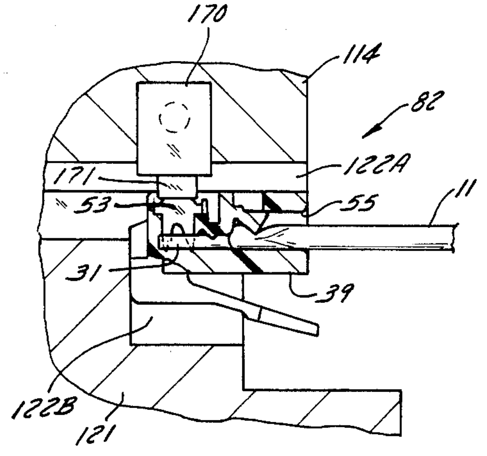
FIG. 14 is an enlarged cross-section view of the connector of FIG. 13 being acted upon by the second press of FIG. 13 which is shown in another operating position.
Figure 15:
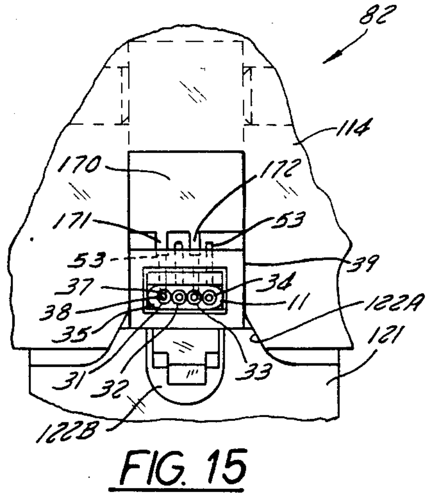
FIG. 15 is an end view of the connector shown in FIG. 14 and showing two of the contacts therein in engagement with two conductors in the cable segment.
Figure 16:
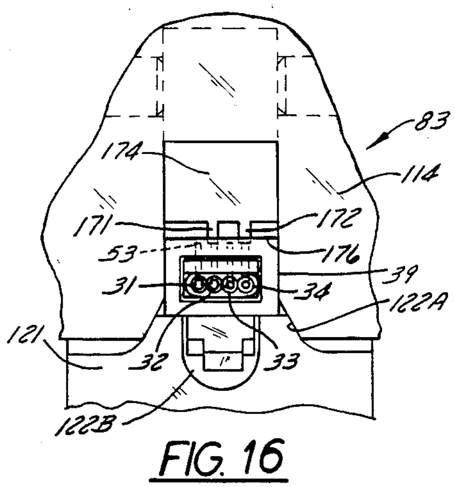
FIG. 16 is a view similar to FIG. 15 but showing the connector in a third press in the connector attachment machine and showing the remaining contacts therein in engagement with the remaining conductors of the cable segment.

As FIGS. 2 through 5 and 11 through 16 show, each connector 39 generally comprises a plastic insulating housing 52 having a cord-receiving cavity 55 extending inwardly from the rear end of housing 52 and terminating at a front wall 56. Cavity 55 defines a forward conductor receiving portion 54 and a rearward sheath receiving portion 57. A plurality of (six) slots such as slot 65 extend inwardly from the front end and upper side of housing 52 and communicate with the cavity portion 54. The four adjacent centermost slots 65 each accommodate an electrically conductive flat connector contact 53. FIGS. 2, 3, 4, 11 and 12 show each contact 53 as being disposed in the uppermost region of a slot 65. FIG. 15 shows two contacts 53 displaced into its lowermost wire-engaging position. FIGS. 5 and 16 show all four contacts 53 displaced into their lowermost wire-engaging positions. When the contacts 53 are fully displaced, they are still accessible from the exterior of housing 52 for electrical contact therewith by mating contacts (not shown) in a connector receptacle (not shown) into which a connector 39 is received. The upper side of housing 52 is provided with recesses 68 and 69 in which displaceable sheath and conductor anchoring members or detents 70 and 71, respectively, are located. As FIG. 11 shows, detent 70 is connected to housing 52 along its forward edge by a web or hinge 72 and at its rear edge by a frangible portion 73. Detent 71 is connected to housing 52 by a frangible rear web 75. As FIGS. 4 and 5 best show, the detents 70 and 71 are displaceable or depressable by tooling, as hereinafter described, so that each moves downwardly and becomes trapped in its lower position in cavity portion 57 or 54, respectively, in housing 52. This causes the front end of sheath 35 of a cord segment 11 to be entrapped beneath detent 70 to mechanically secure the cord segment 11 to housing 52. Similarly, the front end of the insulation 38 on each individual conductor wire 31 through 34 to be entrapped beneath detent 71 to mechanically secure each conductor wire to housing 52. These connections afford strain relief for the connection between end connector 39 and the end of the cable segment 11.

As FIG. 1 shows, the apparatus comprises a machine 14 for drawing a continuous strand 15 of multiconductor cable from a reel 16, for feeding the free end of the strand along a path P1 in incremental steps into the infeed end of an associated conveyor 18 (which includes an inboard unit 40 and an outboard unit 41) and for periodically severing cable segments 11 of desired length from the strand for conveyance by the conveyor 18 in incremental steps along a path P2 to and past cable processing machines which are located on opposite sides of the conveyor to a container 19.

Machine 14 and its associated conveyor 18 may, for example, take the form of a Model CS-30-AT machine available from Artos Engineering Company, 15600 West Lincoln Ave., New Berlin, Wis. 53151, U.S.A., and described in that company's Bulletin No. A-72. Machine 14 comprises a supporting cabinet 13; a wire straightener 20; a measuring and encoder wheel 21; a servo-feed assembly 23 comprising feed wheels (not shown); a cutter head assembly 25; and a pushbutton-type programmable controller 27.

Figure 8:
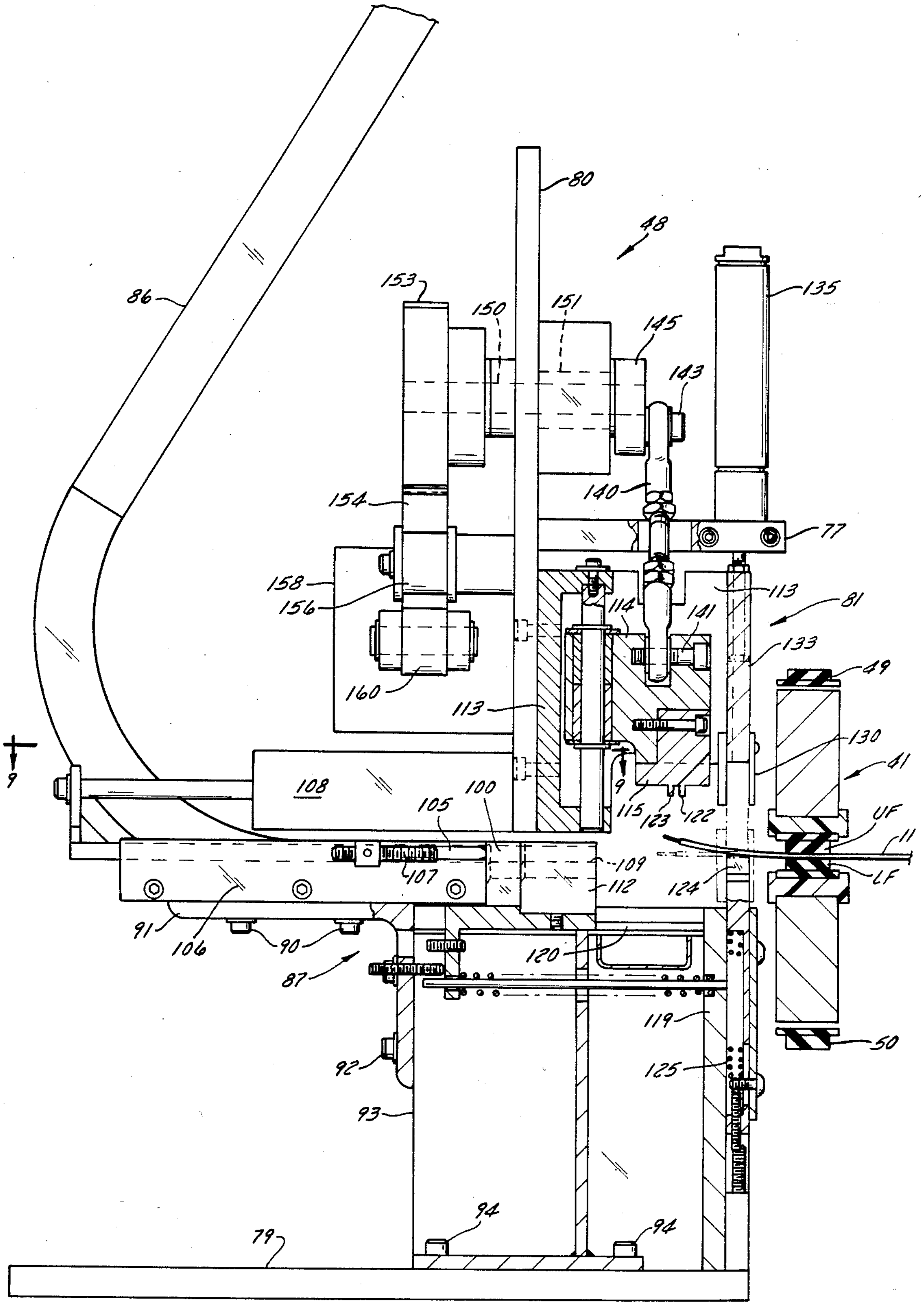
FIG. 8 is an enlarged cross-section view taken on line 8—8 of FIG. 6 and showing details of the connector magazine, connector feed mechanism and a first press in the connector attachment machine.
Figure 9:
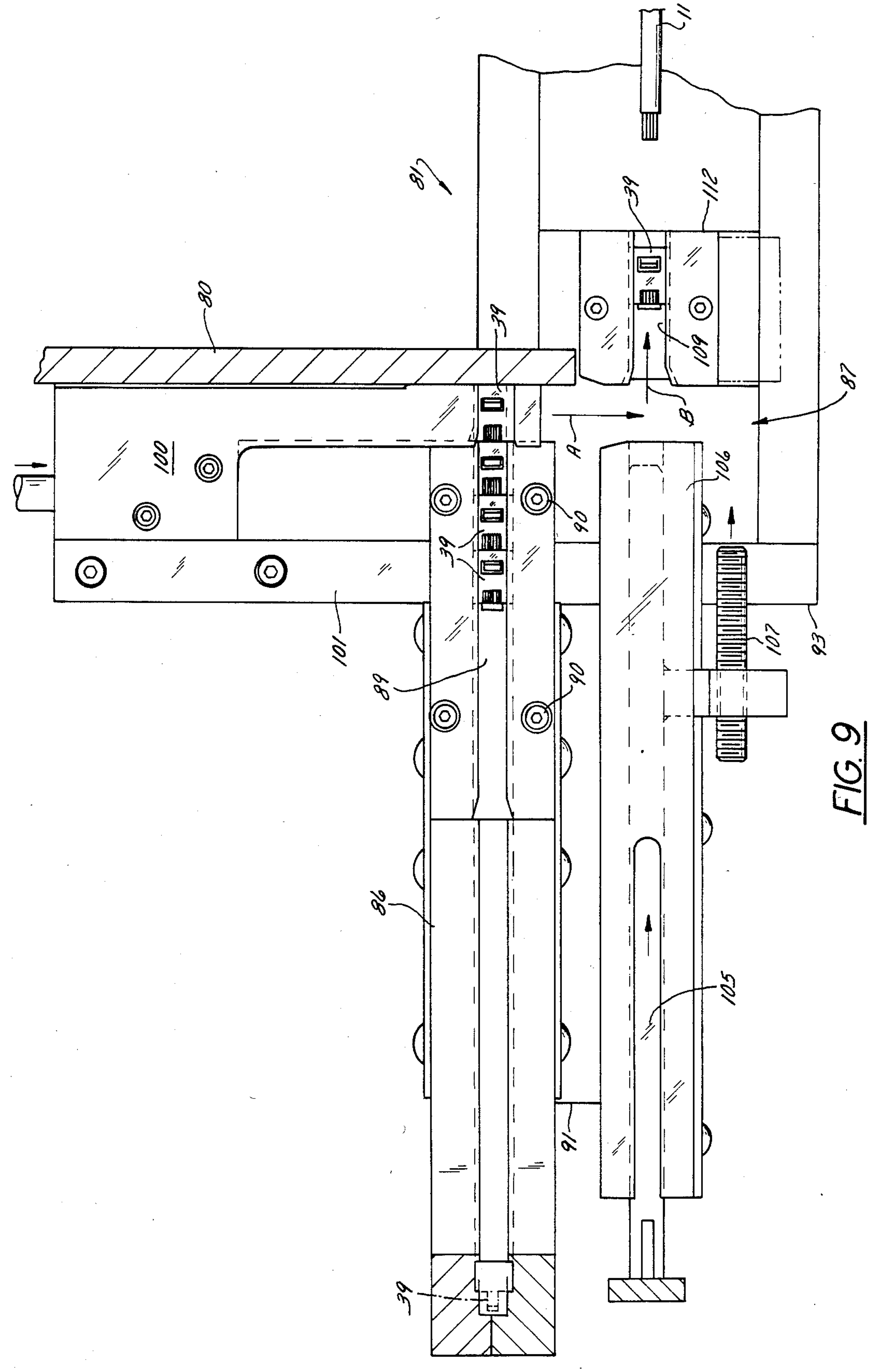
FIG. 9 is an enlarged top plan view, partly in section, of the connector magazine and connector feed mechanism taken on line 9—9 of FIG. 8.
Figure 10:
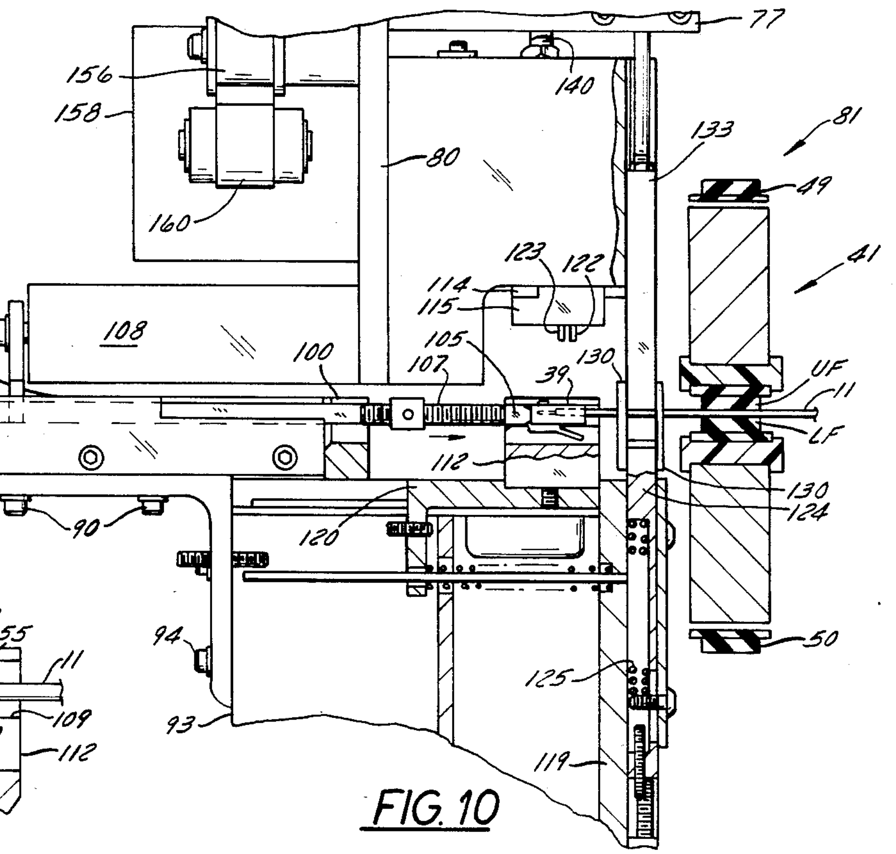
FIG. 10 is a cross-section view similar to FIG. 8 but showing the first press and connector feed mechanism in another operating position.

The conveyor 18 comprises a pair of laterally spaced apart synchronized belt type conveyor units 40 and 41 which are connected to cabinet 13 and driven in synchronism by a Geneva indexing drive mechanism (not shown) in the cabinet. As FIG. 8 shows, each conveyor unit 40 and 41 comprises a pair of endless flexible driven upper and lower belts 49 and 50, respectively, having soft-faced confronting flights UF and LF which are periodically separable to receive the wire strand 15 therebetween and reclosable to grip a wire segment 11 near one end for conveyance. Means are provided to enable insertion of strand 15 into conveyor 18. A separator device 28 is provided in each conveyor unit 40, 41 to periodically separate the confronting belt flights UF and LF and also to periodically separate sets of separable wire guides 29 which are located on opposite sides of each conveyor unit 40, 41. An elongated intermediate wire guide 30 is located on the front of cabinet 13 between the conveyor units 40 and 41 and is operable by a pneumatic motor 31. The aforementioned programmable controller 27 operates the wire cutting machine 14, the conveyor units 40, 41 and all associated components in appropriate synchronism and sequences so as to cut and convey wire segments 11 of predetermined length.

In operation, the strand 15 is cut into segments 11 which are conveyed by conveyor 18 along path P2, which is perpendicular (transverse) in a horizontal plane to path P1, with the longitudinal axis of each segment 11 being disposed perpendicularly (transversely) in a horizontal plane to path P2. The segments 11 are conveyed in spaced apart relationship to one another and in incremental steps along path P2. The ends of each segment 11 project beyond the outboard sides of the conveyor units 40 and 41 so as to be accessible to the wire processing machines 42, 43, 45 and 46, 47, 48, shown in FIG. 1, which are mounted on tables 4 a adjacent the conveyor units 40, 41.

The wire processing machines 42 and 46 are, for example, known types of strippers which strip end portions of the sheath 35 from each segment 11 so that an exact length of exposed conductors 31–34 extend from sheath 35 on the outboard sides of the conveyor units 40 and 41. The wire processing machines 43 and 47 are, for example, known types of trimming machines for trimming the exposed ends of the insulated conductors 31–34 of the segments 11 to ensure that each electrical conductor extends substantially to the end of the insulation therearound and engagement with a contact 53 will be assured (see FIG. 4). The wire processing machines 45 and 48 are improved connector attachment machines in accordance with the invention for mechanically and electrically connecting the connectors 39 to the ends of each segment 11 and are hereinafter described in detail.

Machine 14 and its associated conveyor 18 is capable of processing single conductor wires or cables and multiconductor cables, whether round or flat, up to 2.0 $mm^2$ in diameter; of cutting segments from strands of wire or cable ranging in length from 15 mm to 100 meters; of stripping pieces of insulation therefrom ranging in length from 3.0 to 1000 mm; and of operating at a maximum infeed rate of 4.5 meters per second. Programmable controller 27 is understood to contain two counters (not shown), i.e., a length counter which totalizes the present length of wire and a piece counter which totalizes the number of wire sections cut. Controller 27 also includes two memories (not shown) which hold or store the predetermined length and the number of pieces to be made.

As FIG. 1 shows, the two connector attachment machines 45 and 48, one adjacent the outboard side of each conveyor unit 40 and 41, operate in unison to attach a connector 39 to an end of a segment 11 extending from the conveyor unit. Each machine 45 and 48 operates to mechanically and electrically connect a connector 39 to an end of the cable segment 11 and both machines 45 and 48 cooperate during performance of a continuity test on a finished cord 10. Since machines 45 and 48 are identical to each other (except for being mirror images), only machine 48 is hereinafter described in detail.

Figure 6:
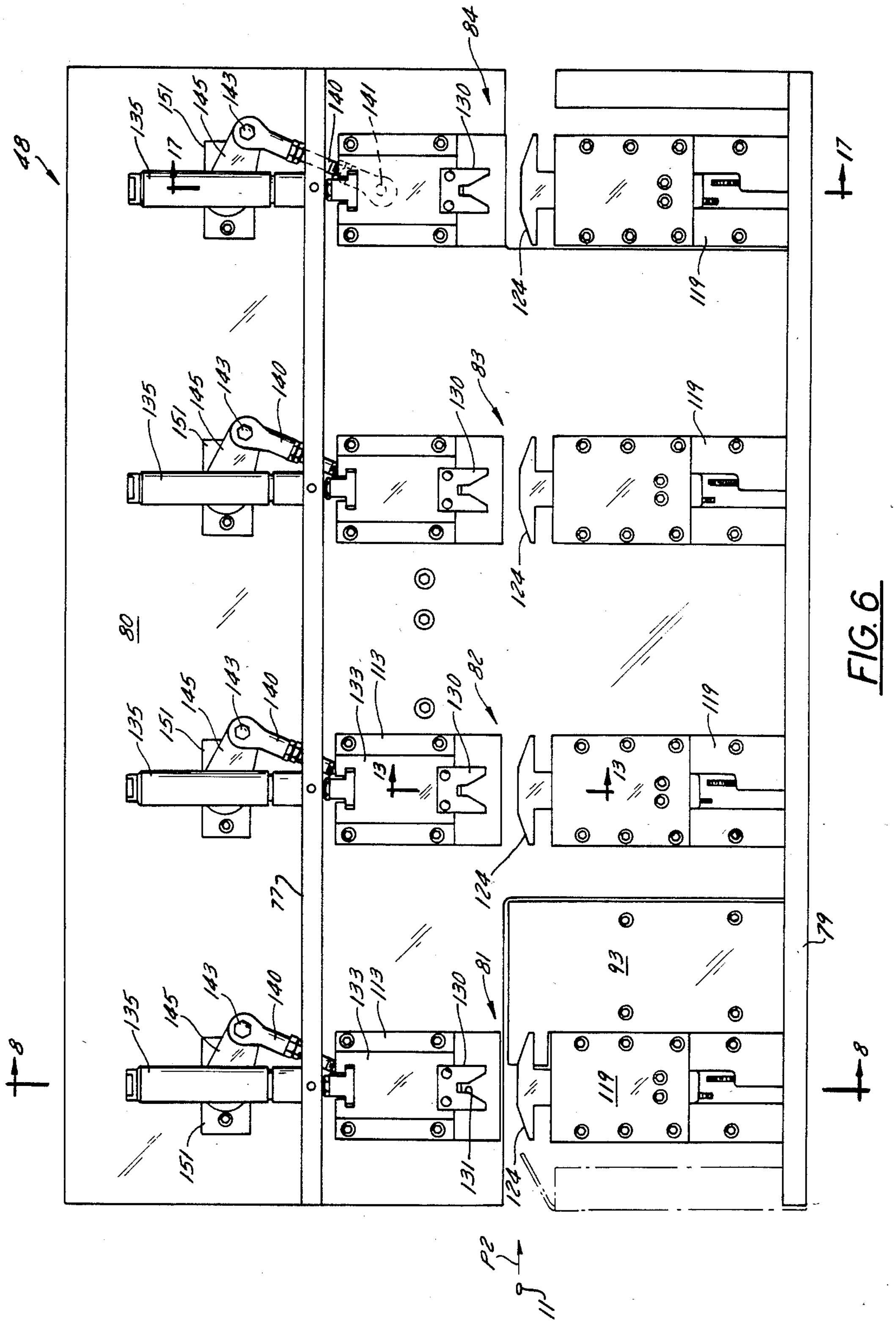
FIG. 6 is an enlarged front elevation view of one of the connector attachment machines of FIG. 1.
Figure 7:
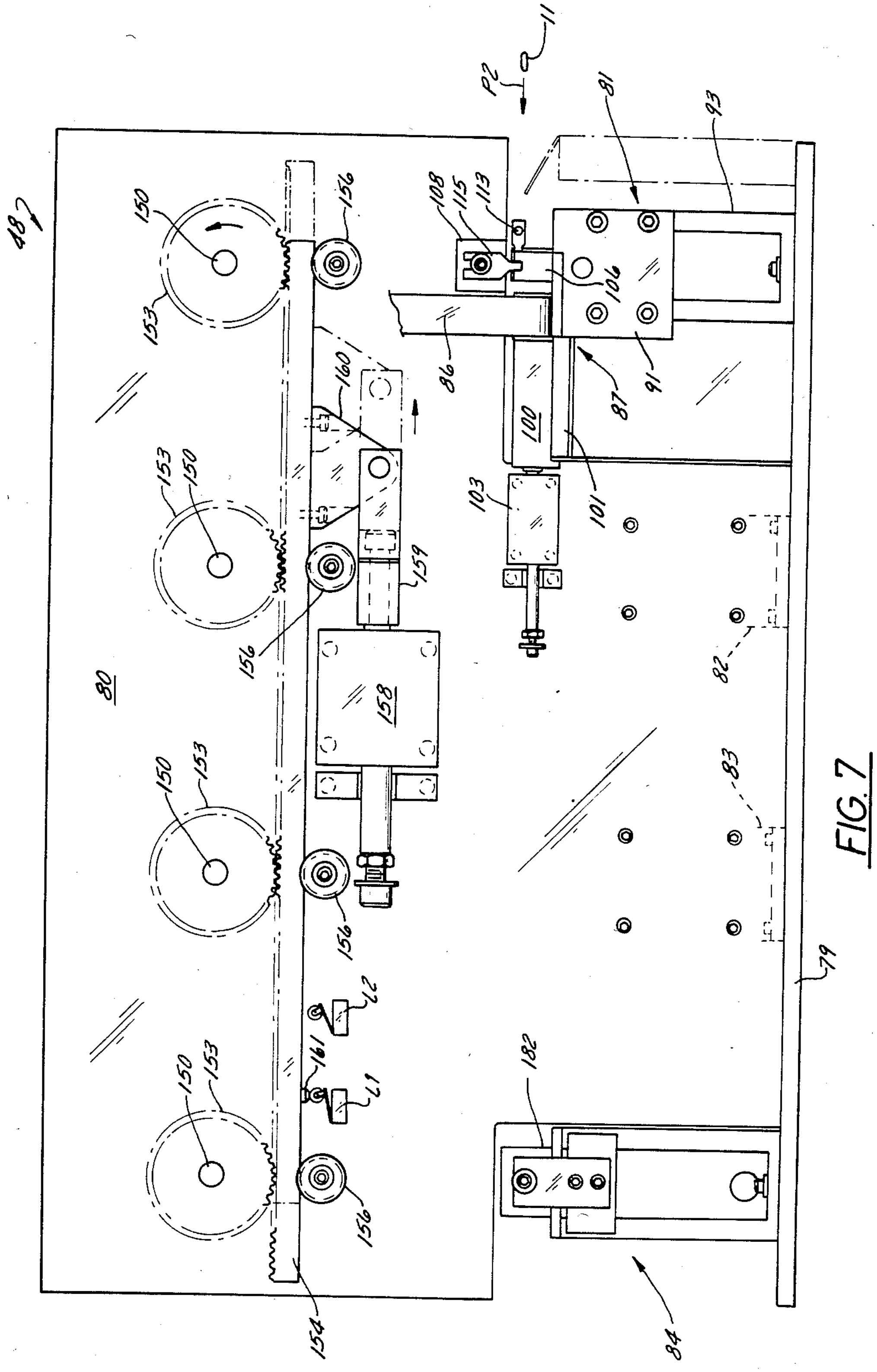
FIG. 7 is a rear elevation view of the connector attachment machine of FIG. 6.

As FIGS. 6 and 7 show, machine 48 comprises a rigid support structure which includes a rigid base plate 79, a generally flat rigid upright or vertical support plate 80 which extends upwardly from base plate 79, and a rigid shelf-like plate 77 which extends from the front of upright plate 80.

As FIG. 6 shows, first, second, third and fourth presses 81, 82, 83 and 84, respectively, are mounted on the front side of vertical support plate 80. As FIG. 7 shows, mounted on the rear of plate 80 are: a storage magazine 86 for connectors 39, a feed means 87 for delivering a connector 39 from the magazine to the first press 81, and means to operate the feed means 87 and the four presses 81 through 84 in synchronism with each other and in synchronism with conveyor 18.

Generally considered, the four presses operate as follows:

The first press 81, shown in FIGS. 8 through 12 receives a connector 39 from the connector delivery means 87 and also receives the end of a cable segment 11 from conveyor 18. When in press 81, the stripped and trimmed end of the cable segment 11 is inserted by the feed means 87 into said cable-receiving cavity 55 in connector housing 52. The first press 81 then operates to displace the detents 70 and 71 in housing 52 to mechanically connect the connector housing 52 to the insulating sheath 35 and to the insulation 38 of the conductors 31–34, as comparison of FIGS. 4 and 5 and 11 and 12 shows.

The second press 82, shown in FIGS. 13, 14 and 15, receives the end of the cable segment 11 with the connector 39 mechanically attached from conveyor 18 and presses two alternate connector contacts 53 in connector housing 52 into electrical engagement with two alternate electrical conductors 31 and 33, as FIG. 15 shows.

The third press 83, shown in FIG. 16 and similar to that of FIG. 11, receives the end of the cable segment 11 with connector 39 mechanically attached from conveyor 18 and presses the two remaining contacts 53 in connector housing 52 into electrical engagement with other electrical conductors 32 and 34, as FIG. 16 shows.

Figure 17:
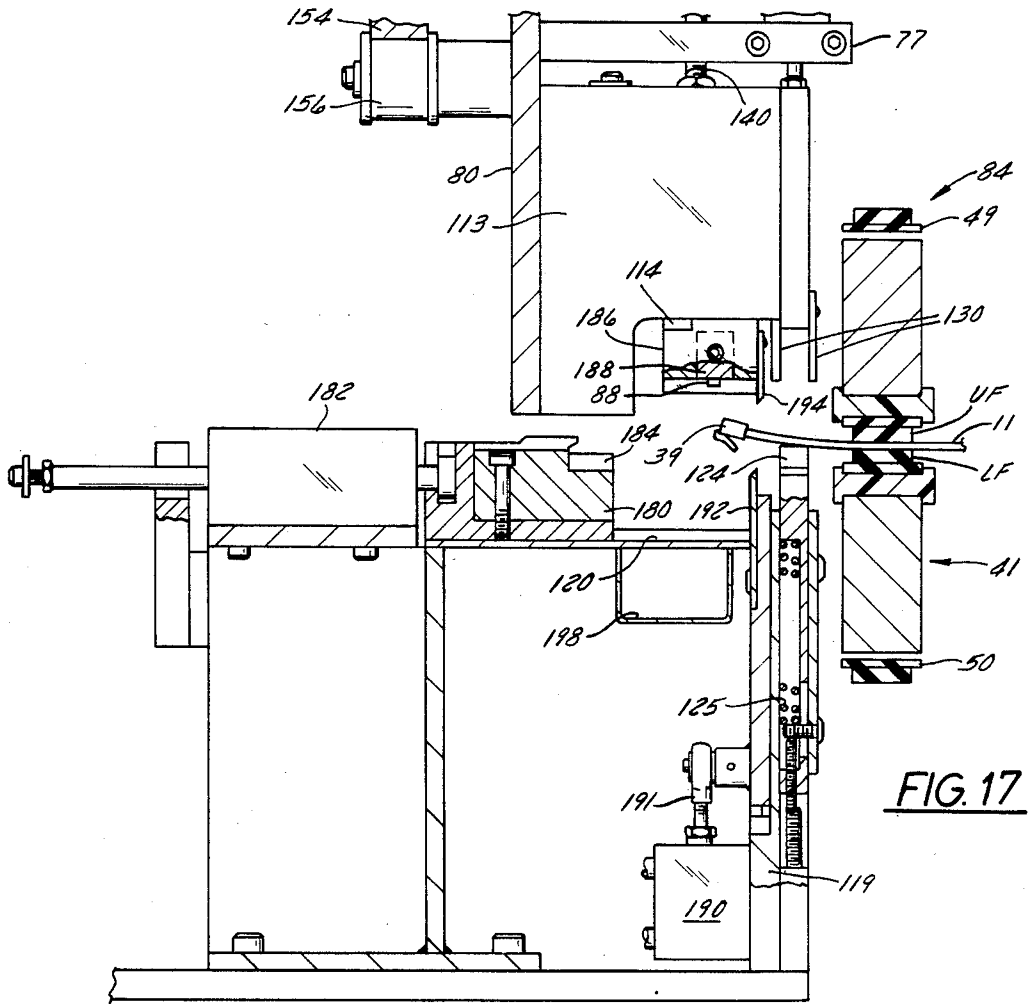
FIG. 17 is an enlarged cross-section view of the continuity testing device of the connector attachment machine taken on line 17—17 of FIG. 6.
Figure 18:
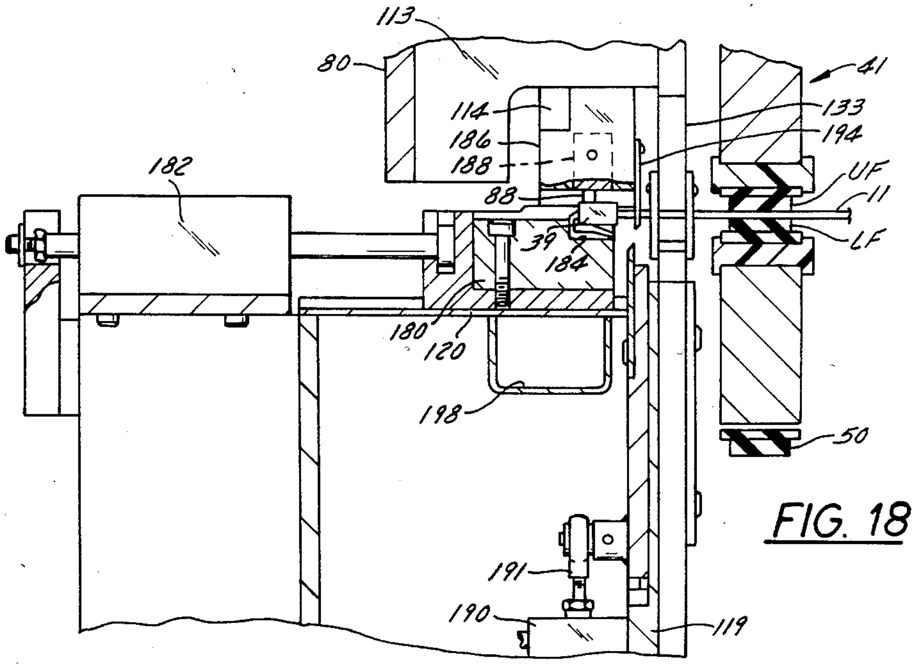
FIG. 18 is a view similar to FIG. 17 but showing the continuity testing device in another operating position.

The fourth press 84, shown in FIGS. 17 and 18, receives one end of the finished cord 10 from conveyor 18, performs an electrical continuity test thereon, and severs and disposes of those that are electrically defective or, if preferred, merely sorts them out.

It is to be understood that each of the four presses 81 through 84 are generally similar to each other in construction, mode of operation and the manner in which it is driven, except as hereinafter explained. Furthermore, each of the four presses 81 through 84 includes means to accurately position and hold the end of a cable segment 11 and connector 39 which enters the press while various operations are performed thereon, by various types of tooling in each press, as hereinafter explained.

As FIGS. 6 and 7 show, each press comprises a stationary lower frame 119; a stationary base member 120; a stationary upper frame 113 on which a head 114 is mounted for reciprocable vertical movement; drive means hereinafter described for effecting vertical movement of head 114; a tool insert, hereinafter described, which is mounted on and movable with head 114; cable segment gripping means including a resiliently mounted lower support member 124 and a pair of vertically movable upper wire guides 130 which are moved by a pneumatic motor 135 mounted on support plate 77; and connector positioning means hereinafter described.

The drive means for effecting vertical movement of head 114 includes a link 140, an arm 145, a shaft 150 and bearing 151 therefor, and a pinion gear 153 driven by rack 154. Since all four pinion gears 153 are driven by the same rack 154, this serves as a synchronizing drive means for ensuring that the presses 81, 82, 83 and 84 are driven in synchronism with each other. This drive means, in turn, is synchronized with the programmable control which also controls operation of the machine 14 and its conveyor 18. More specifically, link 140 has its lower end pivotally connected to head 114 by a screw 141 which serves as a pivot pin and has its upper end pivotally connected by a screw 143 to the outer end of eccentric arm 145. The inner end of arm 145 is rigidly secured to and rotatable with shaft 150 which extends through support plate 80 and is journalled for rotation on a bearing assembly 151 mounted on the front of support plate 80. The rear end of shaft 150 has the pinion gear 153 secured thereto so that limited rotation of the gear effects reciprocating movement of head 114. Limited rotation of gear 153 is effected by reciprocatingly moving the toothed rack 154 which is engaged with pinion gear 153. Rack 154 is mounted for reciprocating movement on a plurality of rollers 156 which are rotatably mounted on the rear of support plate 80, as FIGS. 6, 7 and 8 best show. Rack 154 is driven by a pneumatic cylinder or motor 158 which is mounted on the rear of plate 80 and which has a reciprocable movable piston rod 159 which is connected to rack 154 by a bracket 160. In practice, rack 154 moves about 2 inches in one direction and then back to its starting point. Such movement causes pinion gear to rotate through less than 180 degrees thereby causing rod 140 and the head 114 driven thereby to move vertically through a distance of about 2 inches. Limit switches L1 and L2, actuated by a projection 161 on rack 154, control the motor 158 and ensure precise movement of rack 154. The relationship of arm 145 and shaft 150 is such that in the down position of head 114, arm 145 and link 140 form a straight line. This assures that head 114 always reaches a fixed and repetitive down position, assuring uniform set of strain reliefs and uniform depths of insertion of all contacts 53.

As hereinbefore mentioned, the movable heads 114 in the four presses are provided with appropriate tooling. Each press is also provided with means to accurately position and stationarily hold a connector 39 which enters the press so that it will be properly engaged by the press tooling. In the first press 81, the positioning and holding means for the connector 39 are embodied in components which are part of the connector feed means 87 hereinafter described. In each of the other three presses 82, 83 and 84, the positioning and holding means for connector 39 are embodied in a stationary anvil 121 mounted on stationary base member 120 in the press and upon which the connector 39 rests, and in a recess 122A formed in the lower end of vertically movable head 114 in which the tooling is mounted and which is adapted to receive in close engagement the connector 39 and portions of the anvil 121 when the press closes. The connector 39 is trapped in the recess 122A and cannot shift when the tooling comes into contact therewith. This is essential in view of the very small dimensions and close tolerances involved, since, for example, connector 39 might be on the order of $\frac{1}{4}$ inch wide, $\frac{1}{4}$ inch long and $\frac{1}{4}$ inch high.

The tooling for the four presses 81 through 84 is constructed as follows.

As FIGS. 4, 5, 8, 10, 11 and 12 show, the vertically movable head 114 of press 81 is provided with a die 115 having projections 123 and 122 which crimp the connector 39 to the sheath 35 and to the insulated conductors 31, 32, 33, 34 to mechanically connect these components, as hereinbefore described.

As FIGS. 13, 14 and 15 show, the vertically movable head 114 of press 82 is provided with an insert or die 170 having two projections 171 and 172 which cooperate with anvil 121 and are adapted to engage and depress two contacts 53 through the insulation of the conductor wires 31 and 33 into permanent electrical contact with the conductor therein.

As FIG. 16 shows, the vertically movable head 114 of press 83 is provided with an insert or die 174 which also has two projections 171 and 172 which cooperate with anvil 121 and are adapted to engage and depress the two remaining contacts 53 through the insulation of the conductors 32 and 34 into permanent electrical contact with the conductors therein. Press 82 and 83 are identical except as regards the location of the inserts 170 and 174, respectively, thereof.

As FIGS. 17 and 18 show, the vertically movable head 114 of press 84 is provided with an insert 188 having four electrical contacts 88 thereon which cooperate with a forwardly movable anvil or block 180 in which connector 39 rests and electrically engage the four contacts 53 on connector 39 to perform the continuity test. Head 114 of press 84 is also provided with an upper cable cutting blade 194 which is rigidly secured thereto. Upper blade 194 cooperates with a lower cable cutting blade 192 which is vertically movable by a pneumatic cylinder or motor 190 in press 84, which motor is actuated in the event of a continuity fault to effect cable severance, as hereinafter explained in detail.

As hereinbefore mentioned, each of the four presses 81 through 84 includes a cable segment gripping means to position and stationarily hold the end of a cable segement 11 which enters the press. In the first press 81, these gripping means operate to temporarily hold the end of cable segment 11 in proper fixed position prior to and during the mechanical attachment of the connector 39 to segment 11. In the presses 82, 83 and 84 these gripping means operate to enable the cable segment 11 with connector 39 attached to enter the press and then descend into a cavity 122B in the anvil 121 in presses 82 and 83 and into the cavity 184 in block 180 in press 84. The lower cable support member 124 is resiliently mounted for limited vertical movement on lower frame 119 by a biasing spring 125. Member 124 has an upper position in which it is shown and a lower position (not shown). The pair of spaced apart upper cable guides 130 have cable segment receiving notches 131 therein. Guides 130 are rigidly secured to a plate 133 which is slidably mounted on stationary upper frame 113 of a press and are reciprocably movable vertically by means of a pneumatic cylinder or motor 135. Motor 135 is mounted on support plate 77 which is rigidly secured to and extends from the front of plate 80. In operation, after conveyor 18 presents the end of a cable segment 11 to press, the segment rests on support member 124 which is in upper position. Then, motor 135 causes cable guides 130 to descend and engage the cable segment in its notches 131 and then force it into a fixed position against lower wire support member 124. Member 124 is forced downward to its lower position and the cable segment assumes a lower position. In press 81, when the cable segment 11 is so positioned, the connector feed means 87 operates, as hereinafter described, to emplace a connector 39 onto the end thereof. Then, head 114 is moved downwardly by its drive means so that its projections 122 and 123 operate on detents 70 and 71 of the connector housing, as FIG. 4 and comparison of FIGS. 11 and 12 makes clear. In presses 82, 83 and 84, when cable segment 11 is placed in lower position, the connector 39 on the end thereof is able to enter the anvil cavity 122B.

FIGS. 7 through 10 show details of the magazine 86 which stores the connectors 39 which are to be supplied individually by gravity to the connector delivery or feed means 87 which then presents them to the first press 81. Magazine 86 is a hollow curved member defining a chute 89 which has its lower end rigidly secured by screws 90 to a bracket 91 which, in turn, is rigidly secured by screws 92 to a table structure 93 which is rigidly secured by screws 94 to base plate 79 to the support structure. The feed means 87 comprises a first slide member 100 which is reciprocably movable in the direction of arrow A (FIG. 9) on a slide guide 101 by means of a pneumatic cylinder or motor 103 (FIG. 7). This motion moves the lowermost connector 39 in magazine 86 into a position to be engaged and moved by a second slide member 105, also part of feed means 87, which is reciprocably movable in the direction of arrow B (FIG. 9) on a slide guide 106 by means of a pneumatic cylinder or motor 108 (FIG. 8). This motion moves the connector 39 to the end of a slot 109 in a shiftable block or anvil 112 on first press 81. Second slide member 105 is connected to a screw 107 which is movable therewith and operates to shift block 112 with a connector 39 therein from the position shown in FIGS. 8 and 9 to that shown in FIG. 10 wherein the end of cable segment 11 enters the hole 55 in connector 39. Block 112 serves to stationarily and accurately position connector 39 while the end of the wire segment 11 is inserted therein and while the tooling projections 122 and 123 descend.

OPERATION

The apparatus operates as follows. Machine 14 cuts cable segments 11 which are transported by conveyor 18 in incremental steps along path P2 with the axis of each segment disposed transverse to said path and with an end of a segment 11 projecting outward from a conveyor unit 40, 41. The stripping machines 42 and 46 adjacent the outboard side of the conveyor units 40 and 41, respectively, remove a portion of sheath 35 from the ends of segment 11 to expose the insulated conductors 31 through 34 therewithin. The trimming machines 43 and 47 adjacent the outboard side of the conveyors 40 and 41, respectively, trim the exposed ends of the insulated conductors 31 through 34 to ensure that each electrical conductor 37 extends substantially to the end of the insulation 38 therearound. Each connector attachment machine 45, 48 receives the stripped and trimmed end of a cable segment 11, disposes a connector 39 thereon, mechanically and electrically connects the connector thereto to provide a finished cord 10, performs a continuity test on the finished cord 10, and destroys a finished cord 10 if defective, or sorts it out as a reject at the discharge end of the conveyor.

More specifically, the first press 81 in a connector attachment machine 45, 48 receives the end of a cable segment 11 which is moved thereinto by the conveyor 18. The connector magazine 86 and feed means 87 supply a connector 39 to the first press 81 and associate the connector 39 and segment 11 so that the end of the segment extends into the cavity 55 in the connector housing 52. The first press 81 then operates to displace the anchor or detent means 70 and 71 so that the connector housing 52 mechanically engages the sheath 35 and the insulation 38 on the electrical conductors 31–34. The second press 82 receives the end of the cable segment 11 with the connector 39 mechanically attached thereto and operates to displace some (two) of the electrical contacts 53 so that each displaced contact pierces the insulation 38 on an associated conductor 31–34 and electrically engages the electrical conductor 37 therewithin. The third press 83 receives the end of the cable segment 11 with the connector 39 mechanically attached thereto and with some (two) of the contacts 53 electrically engaged and operates to displace the remainder (two) of the electrical contacts 53 so that each displaced contact pierces the insulation 38 on an associated conductor and electrically engages the electrical conductor 37 therewithin to provide a finished cord 10. The fourth press 84 receives the end of the finished cord 10 and operates to perform an electrical continuity test on the finished cord. The result of the test may be stored in the memory to be used later to sort out defective cords at the discharge end of the conveyor. Or, if desired, the fourth press 84 is further operable to sever the cable segment 11 of the finished cord 10 if the latter is defective.

More specifically, as FIGS. 17 and 18 show, press 84 receives a finished cord 10 from press 83 by means of conveyor 18 and stationarily positions it between the closed cable guide 130 and lower support member 124. Press 84 comprises a positioning block or anvil 180 which is shiftably mounted on stationary base member 120 and movable by means of a pneumatic cylinder or motor 182 between the retracted position shown in FIG. 17 and the extended position shown in FIG. 18. In extended position, block 180 presents a recess 184 into which connector 39 is forced as cable guide 130 closes. With connector 39 thus positioned, the vertically movable head 114 of press 84, which is provided with insert 186, descends so that the electrical contacts 88 on insert 186 make electrical contact with each of the four contacts 53 in connector 39. The four contacts 88 are electrically insulated from each other and each is adapted to make electrical contact with one of the contacts 53. A determination is made as to whether or not electrical continuity exists between the connector 39 at opposite ends of a cord 10. If the test shows continuity, press 84 operates so that head 114 (and its insert 186) retracts upward, so that positioning block 180 retracts (leftward from the position shown in FIG. 18), and so that cable guide 130 opens to allow conveyor 18 to convey the finished and tested cord 10 to container 19 (shown in FIG. 1) or to a bunching device (not shown) which could be mounted on and located at the discharge end of conveyor 18.

On the other hand, if the test shows that there is lack of continuity in any circuit comprising a conductor wire 31, 32, 33 or 34 and the contacts 53 at opposite ends thereof, then press 84 operates either to cause information of a defective cord to be stored in the memory so the cord may be later selected out or to sever the defective cord, depending on the mode of operation which is initially selected and programmed. The severance mode of operation is as follows. While components of press 84 are in the position shown in FIG. 18, pneumatic cylinder or motor 190 is actuated to cause extension of its piston rod 191. Piston rod 191 is connected to move lower cutting blade 192 which is slidably mounted on lower portion 119 of press 84. Lower blade 192 is movable upwardly to cooperate with upper cutting blade 194 on head 114 and such upward movement causes the blades 192 and 194 to sever cord 10 near the connector 39. Then, lower blade 192 retracts and the other components of press 84 retract as hereinbefore described. The severed connector 39 falls out of slot 184 as block 180 retracts and into a trough 198 from whence it is subsequently removed. The severed segment 11 is conveyed to container 19 from whence it is eventually discarded.

It is to be understood, as FIG. 1 makes clear, that the connectors 39 on opposite ends of each finished cord 10 arrive at the presses 84 in the two connector attachment machines 45 and 48 at the same time. The continuity test is carried out establishing whether or not there is current flow from a terminal 53 in one connector 39 to the corresponding terminal 53 in the other connector 39 at the opposite ends of the cord 10. The means to carry out such a test could, for example, comprise a device such as relay (not shown) responsive to a lack of continuity to operate an actuator (not shown) which would effect a severing operation of motor 190.

In an actual embodiment of the invention, the frame 80 of machine 45 was on the order of 2½ feet long and 1½ feet high, the rack 154 moved horizontally about 2 inches in each direction, and each head 114 moved vertically about 2 inches in each direction.

We claim:

1. Apparatus for manufacturing a cord from a connector and a cable segment, said connector comprising a connector housing having a cable-receiving cavity therein, displaceable anchor means and a plurality of displaceable electrical contacts mounted on said connector housing, said cable segment comprising a plurality of individually insulated electrical conductors having an insulating sheath disposed therearound, said apparatus comprising:

(1) a conveyor for moving said cable segment in incremental steps along a path with the axis of said cable segment disposed transverse to said path;

(2) stripping means adjacent said path for removing a portion of said sheath from an end of said cable segment to expose the insulated conductors therewithin;

(3) trimming means adjacent said path for trimming the exposed ends of said insulated conductors to ensure that each electrical conductor extends substantially to the end of the insulation there-around;

(4) connector supply means; and (5) connector attachment means adjacent said path for mechanically and electrically connecting a connector to the stripped and trimmed end of said cable segment so as to provide a cord, for testing said cord and for disposing of said cord if defective, said connector attachment means comprising:

(a) a supporting structure;

(b) first, second, third and fourth presses mounted on said supporting structure and disposed adjacent said path, each press comprising (i) a stationary portion mounted on said supporting structure;

(ii) releasable holding means to temporarily hold in fixed position the end of a cable segment and an associated connector;

(iii) a first motor on said supporting structure for operating said releasable holding means;

(iv) a movable operating member for operating on a connector received in the press; and (v) a rotatable pinion gear shaft for actuating said movable operating member;

(c) and drive means to effect synchronized movement of said movable operating members comprising (i) a plurality of pinion gears, each pinion gear being connected to a rotatable pinion gear shaft of a respective movable operating member;

(ii) a toothed rack mounted for reciprocating movement on said supporting structure and engaged with said plurality of pinion gears; and (iii) a second motor on said supporting structure for effecting reciprocating movement of said toothed rack;

said first press being operable to receive a connector from said connector supply means, to receive the stripped and trimmed end of said cable segment from said trimming means, to dispose said end in said cavity in said connector, and to displace said anchor means so as to mechanically engage said connector with said cable segment;

said second press being operable to receive said end of said cable segment with said connector mechanically attached thereto and to displace some of said electrical contacts so that each displaced contact pierces said insulation on an associated conductor and electrically engages said electrical conductor;

said third press being operable to receive said end of said cable segment with said connector mechanically attached thereto and with some of said contacts electrically engaged and to displace the remainder of said electrical contacts so that each displaced contact pierces said insulation on an associated conductor to provide a cord; and said fourth press being operable to receive the connector end of said cord, to perform an electrical continuity test on said cord, and to dispose of said cord if defective.

2. Connector attachment means according to claim 1 wherein said fourth press comprises a first cable severing blade movable by said movable member, a second cable severing blade, and a motor operable to move said second blade.

3. Connector attachment means according to claim 1 wherein each pinion gear shaft is connected to rotate an arm, wherein each arm is connected to reciprocably move a link which is connected to drive said movable member for a respective press, and wherein each arm and its associated link form a straight line when rotation of the associated pinion gear effects movement of said movable member to its extreme operating position to thereby ensure accurate positioning of said movable members during operation.

4. Apparatus according to claim 1 wherein opposite ends of a cable segment extend from opposite sides of said conveyor, and wherein a stripping means, a trimming means and a connector attachment means is provided for each end of said segment.

* * * * *